United States Patent [19]

Nichols

[11] Patent Number: 4,790,054

[45] Date of Patent: Dec. 13, 1988

[54] MULTI-STAGE VENTURI EJECTOR AND METHOD OF MANUFACTURE THEREOF

[76] Inventor: William O. Nichols, 14 Rowland St., Marblehead, Mass. 01945

[21] Appl. No.: 894,480

[22] Filed: Aug. 6, 1986

Related U.S. Application Data

[62] Division of Ser. No. 754,168, Jul. 12, 1985.

[51] Int. Cl.⁴ ............................................. B23P 13/00
[52] U.S. Cl. ............................ 29/156.7 R; 29/157 C; 29/416
[58] Field of Search ................... 29/156.4 R, 156.7 R, 29/157 C, 416; 417/174

[56] References Cited

U.S. PATENT DOCUMENTS

| | | | |
|---|---|---|---|
| 3,514,231 | 5/1970 | Belden | 417/565 |
| 3,959,864 | 6/1976 | Tell | 29/156.4 R |
| 4,395,202 | 7/1983 | Tell | 417/174 X |
| 4,466,778 | 8/1984 | Volkmann | 417/174 |
| 4,554,956 | 11/1985 | Greenberg | 29/156.4 R X |

Primary Examiner—Mark Rosenbaum
Assistant Examiner—Frances Chin
Attorney, Agent, or Firm—Robert E. Ross

[57] ABSTRACT

The method of manufacture of a multi-stage venturi ejector and body segments thereof which comprises forming an elongated extrusion having an ejector body cross-sectional shape with laterally extending mounting projections and axially extending internal air passages, cutting said extrusion transversely to form ejector body portions of predetermined length, enlarging said passages to a desired size and shape, forming venturi chambers at the front end of one set of air passages and providing check valve means at the other set of air passages, and assembling said body segments end to end.

7 Claims, 1 Drawing Sheet

MULTI-STAGE VENTURI EJECTOR AND METHOD OF MANUFACTURE THEREOF

This application is a division of application Ser. No. 754,168, filed July 12, 1985.

BACKGROUND OF THE INVENTION

In the manufacture of multistage venturi ejectors, it is common to provide several ejector body portions, each with different sizes and shapes of air passages, which are assembled to form a multi-stage unit. A first or upstream unit has a venturi and a mixing nozzle, and the downstream units have mixing nozzles, each of which is usually a separately manufactured unit assembled into the ejector body. The manufacture of such units requires extensive machining and accurate assembly operations, which unduly increases the cost of the final product.

SUMMARY OF THE INVENTION

This invention provides a multi-stage ejector and a method of manufacture thereof. The ejector comprises a plurality of body segments of similar cross-section assembled end to end. A venturi chamber is formed in the front face of each body segment, so shaped that air discharging from an air mixing passage of the previous body segment creates a venturi effect to draw air from an associated exhaust passage. A separately installed venturi nozzle is therefore needed only in the first segment.

The method of manufacture comprises forming an ejector body shape by extruding an elongated shape which has axial air passages and laterally extending mounting projections, cutting said extrusion transversely to form body portions of desired lengths, forming said air passages to a desired size and shape to serve as elongated mixing nozzles, and mounting said body portions end to end with check valve gaskets between adjacent portions.

The provision of the pre-formed axial apertures in the extrusion greatly reduces the amount of machining that must be done on the body portions, and insures accurate alignment of the air passages when the body portions are assembled.

DESCRIPTION OF THE ILLUSTRATED EMBODIMENT

Figure 1:
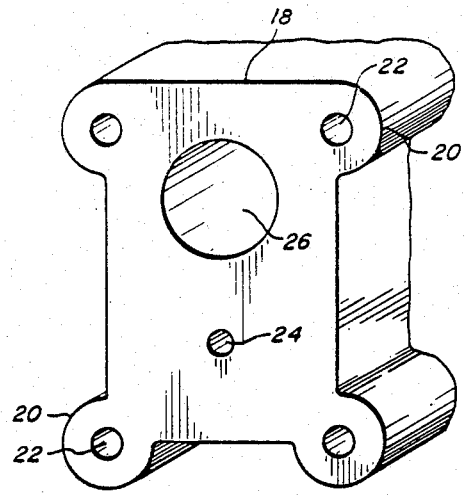
FIG. 1 is an isometric view of an extrusion utilized in the method of the invention.
Figure 2:
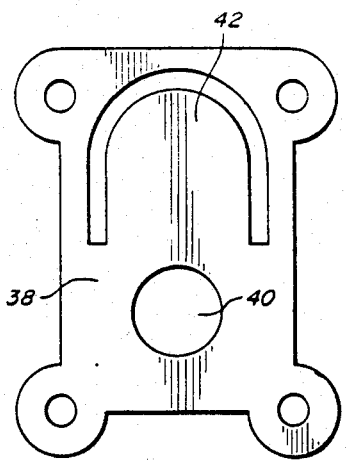
FIG. 2 is a plan view of a check valve gasket used in the venturi ejector.

Referring to the drawing, there is illustrated a multi-stage venturi ejector 10, which comprises three axially aligned body portions 12, 14, and 16.

The body portions are formed by providing an elongated extrusion 18 of indeterminate length, said extrusion having laterally extending mounting projections 20 with apertures 22 extending axially therethrough, an axially extending aperture 24, (to be modified by subsequent machining operations to enable it to serve as a mixing nozzle, as will be described), and a larger axially extending aperture 26, to serve as a vacuum aperture.

The extrusion 18 is then cut transversely to provide extrusion sections having the desired length, such as the length of the body portions 12-14. Each body portion is then subjected to machining operations to provide the body portion with apertures of the desired position, size, and shape to enable the body portion to function as a portion of the ejector 10.

The body portion 12 serves as the first stage of the ejector, and is provided with a vacuum inlet aperture 28 which extends from the exterior of the body to the axially extending vacuum aperture 26, which may be threaded to enable connection to apparatus to which vacuum is to be applied, an air supply nozzle aperture 30, to receive a nozzle 32 which may be connected to an air supply, and a venturi cavity 34 formed at the front end 26 of the air supply passage 24, providing space for the nozzle to extend into the proper spaced relationship with the air supply passage 24. The air supply passage 24 in the body portion 12 serves as a mixing nozzle and is provided with a flared portion 36 to cooperate with the nozzle to provide the desired venturi effect. The venturi cavity is connected to the exhaust aperture 26.

In the illustrated embodiment the air passage 24 in the body portion 12 may be maintained at the same size as originally extruded, except for the flared end 36.

Figure 3:
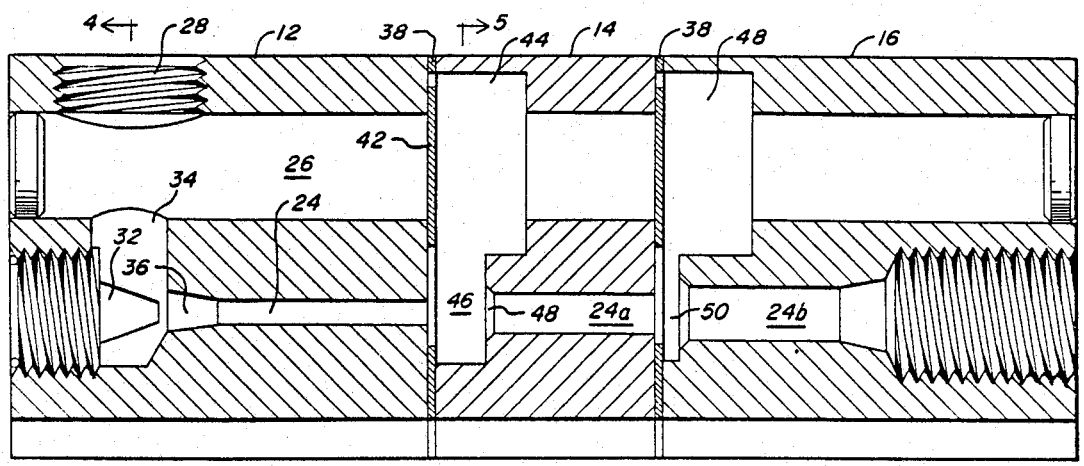
FIG. 3 is a view in elevation, partly in section, of a venturi ejector assembly embodying the features of the invention.
Figure 4:
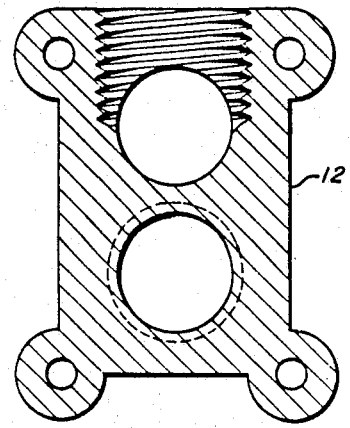
FIG. 4 is a view in section taken on line 4—4 of FIG. 3.
Figure 5:
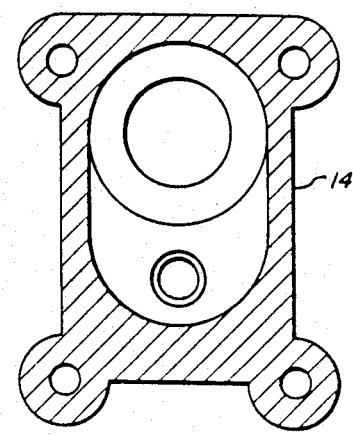
FIG. 5 is a view in section taken on line 5—5 of FIG. 3.

The body portion 14, which is shorter than the body portion 12, is mounted onto the rear end of the front body portion 12, with an intervening check valve gasket 38, which has a lower opening 40 to allow free air flow between the air supply passages of the body portions, and a flapper valve 42 which is so positioned and dimensioned in relation to the aperture 26 of the front body portion 12 that the flapper valve can move rearwardly to the position of the dashed line in FIG. 3 to allow air to flow from the first section to the second section, and to prevent air from flowing in the reverse direction. The body portion 14 is radially enlarged by machining to provide a cavity 44 at the front end of the exhaust aperture 26 to provide room for the operation of the flapper valve.

An air supply passage 24a is provided in the body portion 14 by enlarging the aperture 24 of the extrusion, to serve as a mixing nozzle, and a venturi cavity 46 is formed at the front end of the air supply aperture to space the entrance 48 of the air passage 24a (which may be flared) into a desired relation to the rear end of the air passasge of the front body portion 12. The venturi cavity 46 is connected to the enlarged portion 44.

The rear body portion 16 is mounted onto the rear end of the intermediate body portion 14 by a check valve gasket 38 which is suitably dimensioned for the purpose previously described. An enlarged cavity 48 is formed on the front end of the body around the exhaust aperture 26.

The air passage 24 of the portion of the extrusion used to make the body portion 16 is enlarged to provide an air passage 24b to serve as a mixing chamber, said passage having a greater distance than that of the air supply aperture of the intermediate body portion, and a venturi cavity 50 is provided at the front end of the air passage 24b to space the front end 50 of said aperture (which may be flared) a desired distance from the rear end of the air mixing nozzle 24a of the intermediate body portion 14. The aperture 24b is connected to the exhaust aperture 48.

In operation, when first started, the air passing from the nozzle 32 through the venturi chamber 34 and into the air passage 24a draws air from the exhaust aperture 26; the air mixture passing out of the rear end of air passage 24 through venturi chamber 44 and into air passage 24a draws air from exhaust cavity 44; and air passing out of the end of passage 24a through venturi cavity 50 and into air passage 24b draws air from exhaust cavity 48. Each of the passages 24, 24a, and 24b serve as mixing nozzles. At this time the flapper valves are open so that all three venturis draw air from the inlet aperture 28.

As the pressure at the inlet aperture (which may be connected to a vacuum tank) drops, the flapper valves close so that only the venturi chamber of the first body segment is exhausting air from the inlet opening.

The provision of extruded body segments which are intially identical in cross-section, with pre-formed exhaust and air supply and mixing apertures and mounting apertures greatly reduces the amount and expense of machining necessary to provide the required air passages, and venturi cavities of the desired size, and enables the economical manufacture of multi-stage venturi ejectors with air passages of various sizes to accommodate different air pressures and vacuum requirements.

For example in the illustrated embodiment, the diameter of the air mixing nozzles 24a and 24b of body segments 14 and 16 is larger than the diameter of the preceeding body segment, and the depth of the venturi chamber in these body segments is less than that of the preceeding segment, to maximize the effect of the venturis. These dimensions may be easily varied as desired.

By providing a venturi cavity at the front face of the second and third body segments, positioned to cooperate with the rear end of the air passage of the preceeding body segment to create a venture effect, the expense of providing separate nozzle inserts for these body segments is avoided.

The provision of the elongated passages to serve as mixing nozzles also increases the effectiveness of the device.

Although in the illustrated embodiment of the invention, three body segments are provided, more or less may be provided if desired.

Since certain modifications apparent to one skilled in the art may be made in the herein illustrated embodiment of the invention, it is intended that all matter contained herein be interpreted in an illustrative and not a limiting sense.

I claim:

1. A method of manufacturing a multi-stage venturi ejector assembly, comprising
   extruding an elongated body having first and second spaced axially extending apertures,
   forming venturi ejector body segments by cutting said elongated body transversely, each body segment having a front end and a rear end,
   forming a venturi cavity in each of said body segments at the front end of the first aperture of each body,
   forming a fluid flow passage connecting the venturi cavity of a body segment to the second aperture of the body segment, and
   assembling said body segments end to end with the front end of each segment after the front segment being positioned at the rear end of the segment in front thereof,
   whereby said segment apertures form first and second fluid flow passages in the assembly, and whereby fluid exiting the first aperture of each body segment except the rear body segment discharges through a venturi cavity into the first aperture of the body segment to the rear thereof.

2. A method as set out in claim 1 in which includes forming a flared portion at the front end of each of said first apertures.

3. A method as set out in claim 1 which includes the further step of providing a check valve for each body segment except the rearmost segment that allows only rearward fluid flow therethrough.

4. A method of manufacturing a multi-stage injector comprising
   forming, by extruding, an elongated body having upper and lower axially extending apertures, the lower aperture being smaller in diameter than the upper aperture,
   forming venturi body segments by cutting said elongated body transversely, said body segments having front and rear ends,
   forming a venturi cavity at the front end of each body segment at the end of the upper aperture,
   forming a venturi cavity in the front end of said body segments at the lower aperture, said cavities at the upper and lower apertures being connected,
   forming a flared front end on said lower apertures, and
   assembling said body segments end to end with check valve means between adjacent body segments, the segments being oriented so that the upper and lower aperture of each segment is aligned with the upper and lower aperture, respectively, of an adjacent body segment,
   whereby the rear end of the lower aperture of each body segment except the rearmost segment discharges through the cavity at the front of the lower aperture of the body segment to the rear thereof and into the flared end of the lower aperture of said body segment, the check valve having a structure permitting only rearward flow in said upper aperture in which it is assembled.

5. The method as set out in claim 4 which includes the steps of
   providing the lower apertures of the segments behind the front segment with a diameter greater than that of the first aperture of the body segment forwardly thereof and providing each venturi cavity of the lower aperture so as to have a depth less than that of the venturi cavity in the segment just forwardly thereof.

6. A method of manufacturing intermediate venturi portions of a multi-stage venturi ejector assembly of the type having front, rear, and intermediate segments,
   comprising extruding an elongated body having first and second laterally spaced axial apertures extending therethrough,
   forming venturi body segments therefrom by cutting said elongated body transversely forming body segments having front and rear ends with first and second laterally spaced apertures extending between the ends,
   forming a venturi cavity in each body segment at an end of the first aperture,
   forming a passage in each body segment which allows fluid flow between the venturi cavity and the second aperture when the segments are assembled end to end in the manner hereinafter described, whereby when a plurality of said segments are assembled end to end with corresponding ends facing in the same direction, a first axial fluid flow passage is formed in the assembly with a venturi cavity between each segment whereby said passage can serve as an air supply passage, and a second axial fluid flow passage is formed in the assembly to serve as an exhaust passage.

7. A method as set out in claim 6 which includes the step of assembling a plurality of body segments end to end with corresponding ends facing in the same direction with a check valve positioned between adjacent body segments, said check valve structure allowing fluid flow in the second passage of the body segment forwardly thereof only in a direction from the front end to the rear end thereof.

* * * * *